Sept. 28, 1965     W. H. GRAVERT     3,208,469
MARINE TANKER FLUID CARGO CONTROL
Filed July 11, 1962     4 Sheets-Sheet 1
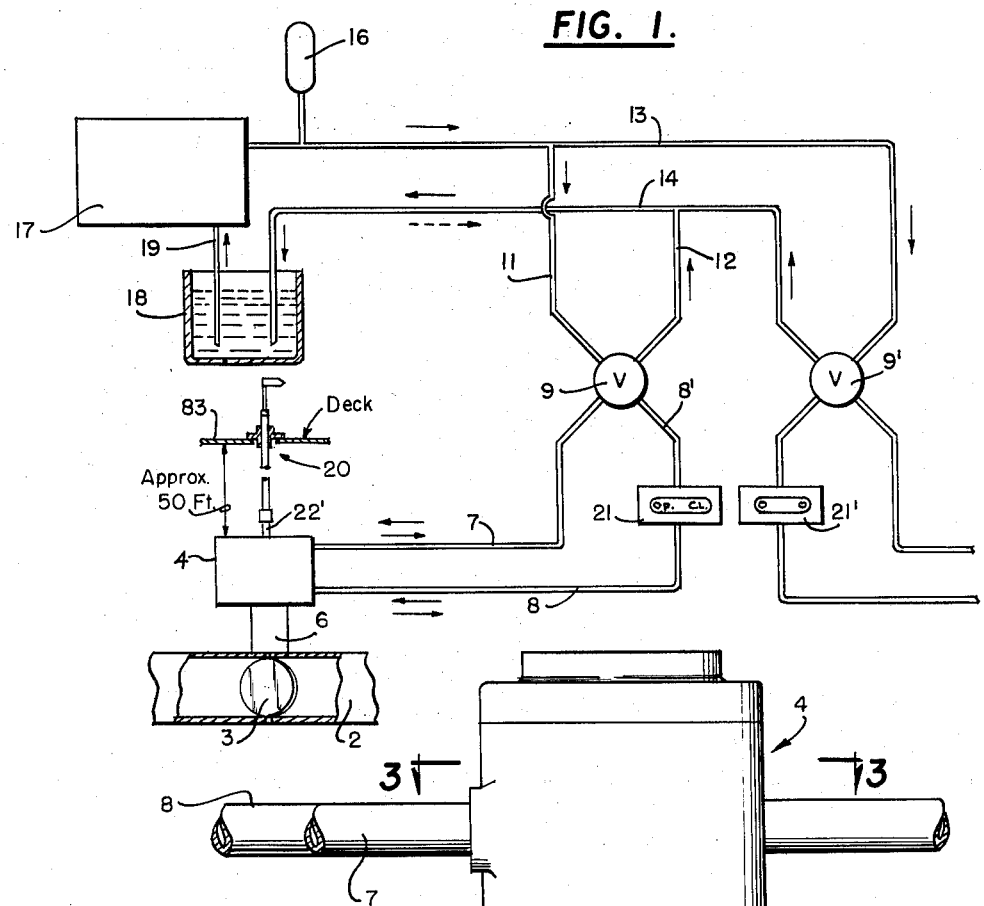
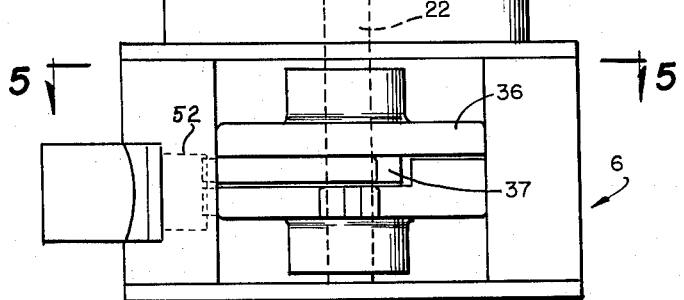
INVENTOR
William H. Gravert
BY
ATTORNEY Sept. 28, 1965  W. H. GRAVERT  3,208,469
MARINE TANKER FLUID CARGO CONTROL
Filed July 11, 1962  4 Sheets-Sheet 2
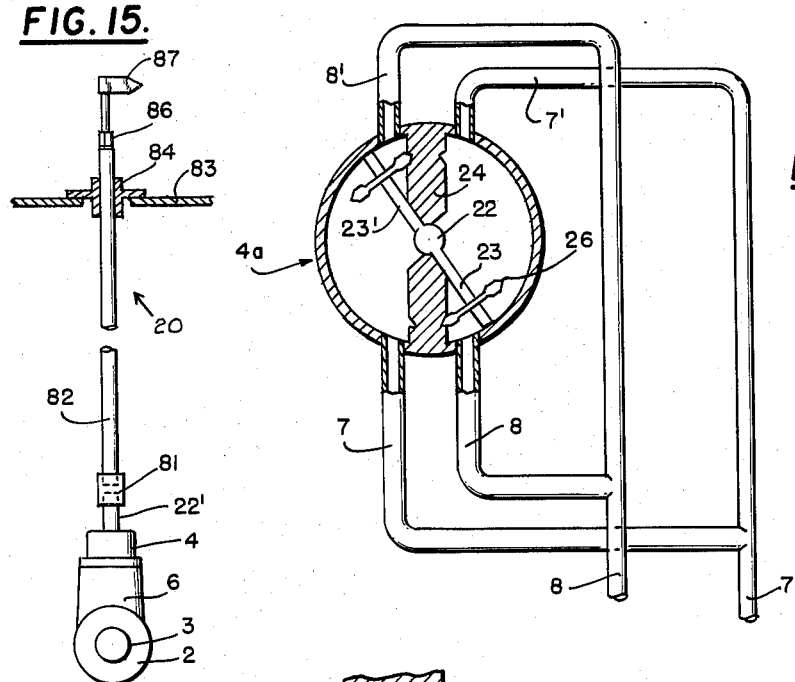
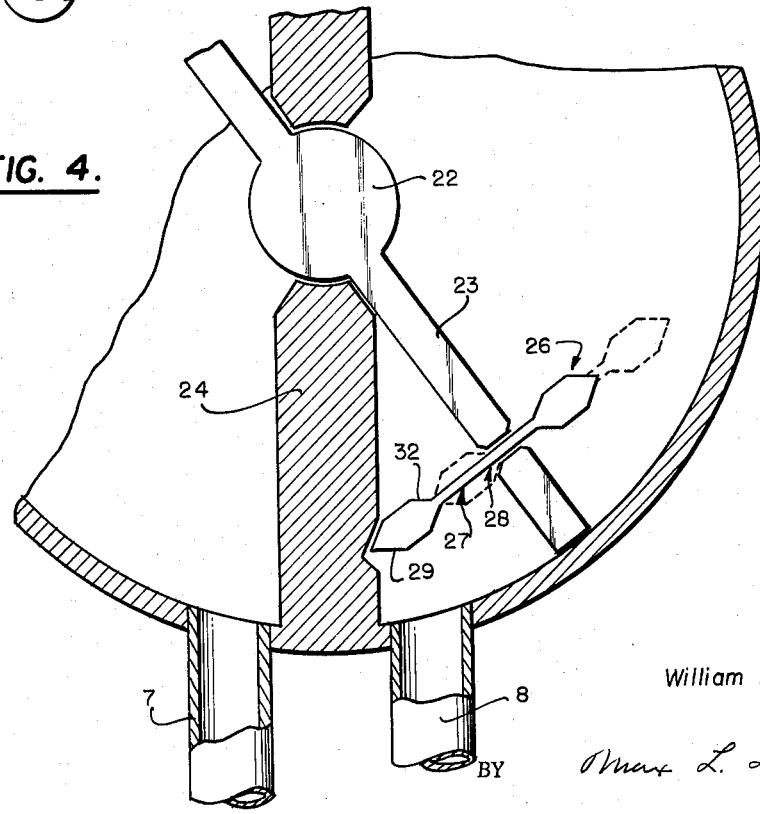
INVENTOR
William H. Gravert
BY Max L. Libman
ATTORNEY INVENTOR
William H. Gravert
BY Max L. Libman
ATTORNEY

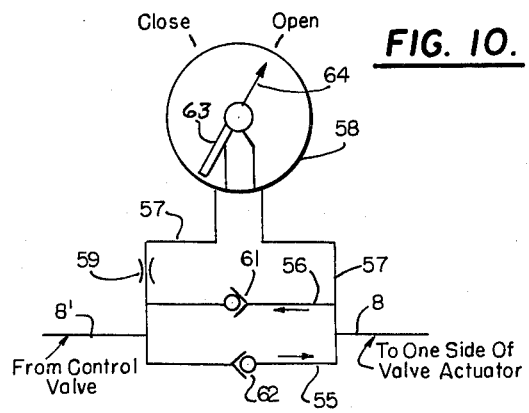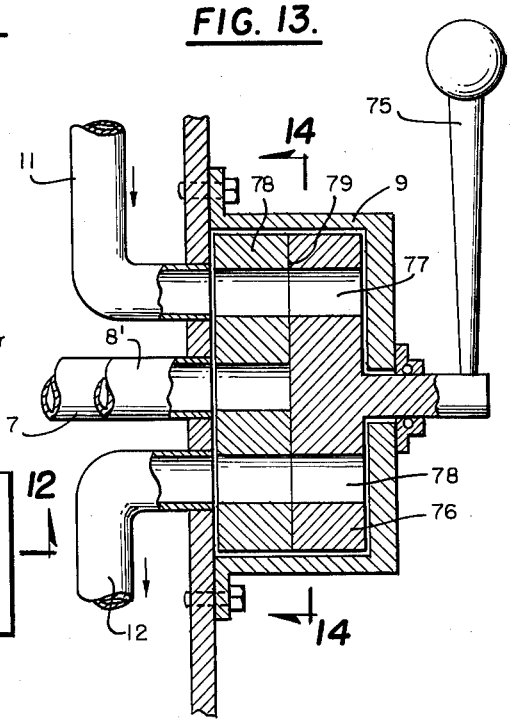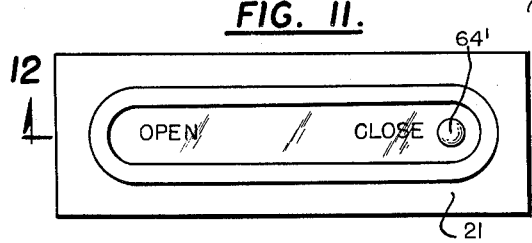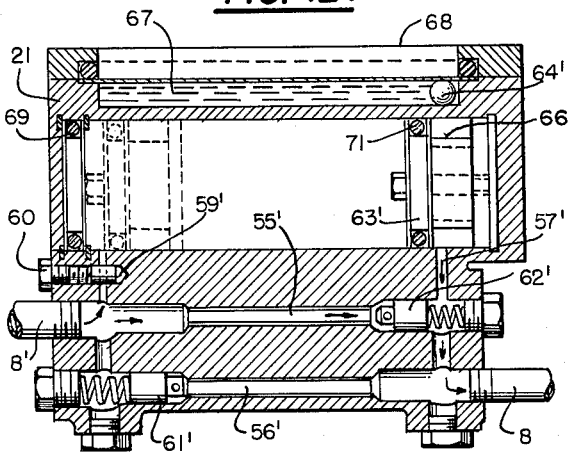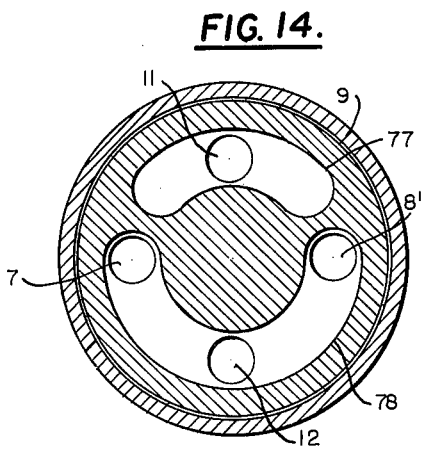

United States Patent Office 3,208,469
Patented Sept. 28, 1965

3,208,469
MARINE TANKER FLUID CARGO CONTROL
William H. Gravert, Port Washington, N.Y., assignor to Marine Moisture Control Company, Inc., Inwood, N.Y., a corporation of New York
Filed July 11, 1962, Ser. No. 209,142
15 Claims. (Cl. 137—343)

This invention relates to improved means for controlling the flow of fluid cargo into and from storage tanks, and particularly storage tanks and compartments in tanker ships and the like.

It is a major object of the invention to improve components used for the control of fluid flow, and provide an improved interrelationship of the components and system whereby an operator at a remote control point can operate the valves controlling the flow of fluid, primarily petroleum products, into and out of the separate tanks or compartments of the vessel.

Modern oil tankers are provided with many large storage tanks or compartments for petroleum products, and for rapid and efficient loading and unloading of the vessel, it is desirable that an operator at a remote location be able to control the opening and closing of valves located, in some instances, hundreds of feet away. Typically, the operator will stand at a control board having a multiplicity of control levers or handles, each of which can be operated to remotely direct the operation of a remote main valve to the open or closed position, or to some intermediate position, if desired. Hydraulic control systems are almost universally used, since electrical systems are undesirable because of the danger of electric sparks and explosion or ignition of the highly volatile and combustible fuel products. Such a hydraulic control system requires extensive piping to be run throughout the vessel, sometimes for hundreds of feet, and this piping is usually required to be of stainless steel or similar very expensive materials. It is therefore highly desirable to reduce the total length of piping required, by providing all of the control and indicating functions in a two pipe circuit for each valve to be remotely controlled. Since the valves are often at inaccessible locations within the ship, it is necessary to have a remote indication which will accurately show the operative condition of each main valve.

It is a major object of the invention to provide improved means for solving the above and other related problems.

Another object is to provide an improved hydraulic actuator for the main valve of tank compartments, of rugged and durable construction such as is required by marine service, and one which is provided with automatic and simple self-flushing means.

Another object is to provide a main valve actuator having means for automatically retaining the main fuel valve positively in the locked or in the open position even when the hydraulic control system has been cut off, yet capable of release for normal operation upon actuation of the hydraulic control system, without requiring additional control lines between the valve and the operating station.

Still another object is to provide a remote indicator at the control station for showing the operative condition of the main valve, without requiring additional hydraulic or electrical lines, and one which will not interfere with the full flow of hydraulic control fluid in the control pipe lines.

A further object is to provide such an indicator which retains its last position, even with the hydraulic system shut off.

A further object is to provide a remote control valve for the hydraulic control system arranged to prevent damage by expansion of fluid in the hydraulic control lines due to temperature rise, by providing free drainage in the hydraulic control lines when the control system is shut off.

A further object is to provide components in a system of the above-described type, which are rugged, durable, highly reliable in operation, and require practically no maintenance over extended periods of time, as required by marine service.

According to the invention, the remotely located control valve of a tanker or similar device is operated from a central or other remote point by hydraulic motor means fed with pressure liquid through a hydraulic circuit under control of valve means accessible to the operator for controlling the flow of pressure fluid in said circuit. The hydraulic motor or actuator is provided with simple valve means whereby at the end of its travel in either direction to respectively open or control the main valve, a small valve in the actuator is opened to enable the flow of fluid through the actuator to flush the same and thereby prevent the accumulation of gummy deposits which may interefere, in time, with the operation of the actuator. A special clutch is provided between the actuator and the main supply valve to be controlled, said clutch having means for automatically locking the valve in either extreme position, together with means for releasing said lock when the valve is operated in the opposite direction by the initial movement of the actuator. The remote control valve, which is worked by the operator, is so ported and arranged, that in the neutral position, when the system is not being used, the pressure control lines of the actuator are connected to an external return system, thereby preventing the possibility of damage due to the expansion of the pressure fluid by temperature rise. A novel indicator is provided in the pressure line, for showing the operative condition of the actuated valve in response to the change of direction of flow of pressure fluid as the valve is operated from one condition to the other, but a dual check valve and bypass arrangement are provided so that the indicator does not interfere with the adequate flow of pressure fluid required for the proper operation of the actuator or hydraulic motor.

The specific nature of the invention, as well as other objects and advantages thereof, will clearly appear from a description of a preferred embodiment as shown in the accompanying drawings, in which:

FIG. 1 is a diagrammatic circuit drawing of a typical system embodying the invention;

FIG. 2 is a side elevation showing the hydraulic actuator, locking clutch, and part of a typical butterfly valve of the system shown in FIG. 1;

FIG. 3 is a sectional view taken on line 3—3 of FIG. 2 of the hydraulic actuator, together with typical associated piping;

FIG. 4 is an enlarged detail view of a portion of FIG. 3;

FIG. 10 is a diagrammatic view showing the principle of operation of the remote indicator of the system shown in FIG. 1;

FIG. 11 is an end view of the remote valve position indicator shown in FIG. 1;

FIG. 12 is a sectional view taken on line 12—12 of FIG. 11;

FIG. 13 is a sectional view taken through the manual reversing valve of FIG. 1, showing the pressure relieving means;

FIG. 14 is a sectional view taken on line 14—14 of FIG. 13; and

FIG. 15 is an enlarged detail view of a portion of FIG. 1.

Figure 5:
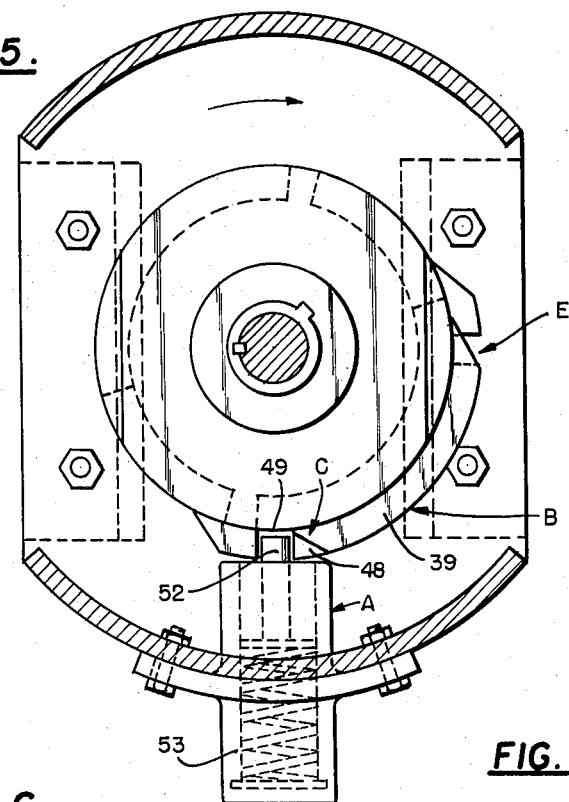
FIG. 5 is a sectional view taken on line 5—5 of FIG. 2.
Figure 6:
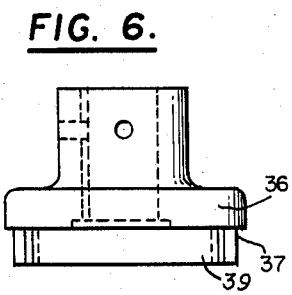
FIGS. 6 and 7 are respectively side and bottom elevations of the top half of the clutch shown in FIG. 2.
Figure 8:
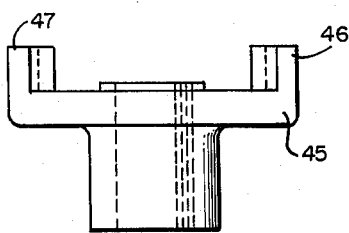
FIGS. 8 and 9 are respectively side and top elevations of the half of the clutch shown in FIG. 2.
Figure 7:
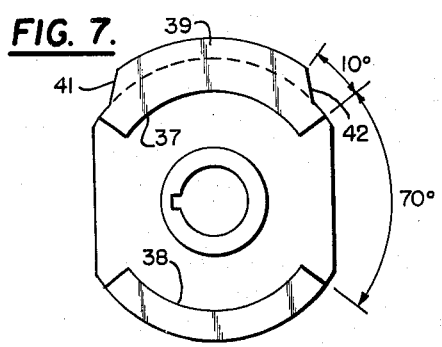
Figure 9:
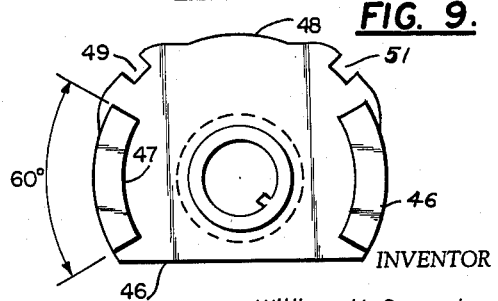

Referring to FIG. 1, the main supply line 2 of an individual tanker compartment of an oil tanker is controlled by butterfly valve 3, which may be of known construction, forming no part of the present invention per se. The butterfly valve 3 can be swung through 90° from the full open to the full closed position by means of a hydraulic motor or actuator 4 through a clutch 6. The actuator and clutch will be described in detail below. Hydraulic actuator 4 is controlled by pressure lines 7 and 8, through which pressure fluid flows in one direction to operate the butterfly valve 3 open and in the other direction to operate the valve closed. The direction of flow of fluid in lines 7 and 8 in controlled by manual reversing valve 9, which controls the flow of fluid from pressure line 11 to return line 12. Line 11 is connected to the main pressure line 13, in which fluid is maintained at a suitable high pressure, typically in the order of 600 p.s.i. A surge chamber 16 is provided to level out the pressure in the system, and the pressure is maintained by a power package 17 of special design, which is, however, not a part of the present invention, as any suitable means for this purpose may be employed. The power package cooperates with a sump tank 18 into which return fluid from line 14 is dumped, and from which it draws fluid on line 19 for the pressure line 13.

A valve position indicator 21 is provided in either one of lines 7 or 8, and is preferably located very close to the manual reversing valve 9, in order to show the operating condition of butterfly valve 3, which is usually operated in the full open or the full closed position, although intermediate positions will also be indicated. A second manual reversing valve 9′ for a second similar system is also shown, and in practice there will usually be a number of such valves, all located together on a single control board for operation of the remote main valves (similar to valve 3) from a single control point. An emergency manual actuator and direct-connected mechanical indicator 20 are optional auxiliary equipment which will be explained later.

FIG. 2 shows a practical construction of the actuator 4, clutch and lock mechanism 6, arranged for controlling butterfly valve 3.

FIGS. 3 and 4 show in more detail the construction of the hydraulic actuator. In order to fully open and close the butterfly valve 3, it is necessary to rotate shaft 22 at will in both directions through an angle of 100°, as will be explained below. This is accomplished by vanes 23, which are fixed to shaft 22 within the actuator housing. In the position shown in FIG. 3, the butterfly valve will be in one extreme position, which may be either open or closed. In order to move it to the other extreme position, that is, rotated through its required angle, valve 9 is operated to connect pipe line 8 to high pressure line 13 (FIG. 1). When this is done, the pressure fluid from line 8 forces vane 23 to rotate in a counter-clockwise direction, carrying with it shaft 22, until either the pressure supply is shut off, or alternatively, and more commonly, until vane 23 engages the bevelled portion of divider 24 which extends from the casing 4a of the actuator into a closely fitting sliding engagement with shaft 22 as shown. It should be noted that in the position shown in FIG. 4, pin valve 26 provides a small opening in the vane 23, because the diameter of its shaft 27 is smaller than the orifice 28 through which it passes, and the lower end 29 of the pin valve is engaged with a portion of divider 24 to unseat the valve 26 at the upper end of the pin valve structure. However, the aperture at 28 is so small in relation to the quantity of fluid available that no great pressure drop takes place and the pressure fluid is still able to move the vane 23; as soon as the pressure is applied through pipeline 8, valve 26 slides forward in the direction of the vane until valve portion 32 is seated against the countersunk portion of the vane aperture 28. Thereafter, the full pressure is available to rotate the vane and its attached shaft 22. However, when the vane 23 approaches the upper divider 24, it is similarly restricted to 100° of rotation by the bevelled edge of the upper divider, and shortly prior to reaching this position, pin valve 26 is again opened by the forward projecting end of the pin valve striking divider 24 to open the valve, very much as shown in FIG. 4, except that the opposite end is now active. This again makes available a small clearance in passage-way 28, which enables a restricted flow of fluid from one side of the vane 23 to the other. In this type of service, the actuator is about 60 feet below the hydraulic power supply and at the end of about 200 feet of tubing. If this clearance were not provided, the vane would furnish a dead end for the pressure fluid in lines 7 and 8, without through circulation, and sludge and dirt would tend to accumulate in the two chambers formed by the vane. The restricted orifice 28 permits a small continued flow of pressure fluid even after the vane has reached its extreme position, which tends to carry away and accumulated sludge and dirt, and aids in the maintenance-free operation of the device. Using this valve makes it possible to change the hydraulic fluid in the system with each of the actuators inaccessible. This is the case when the tanker is loaded with oil and the actuators are inside the cargo tank.

FIG. 3 shows additional pipe extensions 7′ and 8′, as one way of utilizing more efficiently the vane area by providing two vanes 23 and 23′, which is possible where only 100° of motion is required, as in the present case. Any other conduit arrangement for supply the two vanes may be employed.

Since the manual reversing valve 9 permits either line 7 or 8 to be connected to the high pressure line 13, it will be apparent that pressure will be applied to either side of vane 23 to operate it in either direction as required to open or close the butterfly valve 3.

As best seen in FIG. 2, shaft 22 of actuator 4 is connected to butterfly valve 3 through a special clutch 6, which will now be described (FIGS. 5–9). Actuator 36 of the clutch is fixed to shaft 22 and has downwardly extending fingers 37 and 38 providing an angular space between them of, for example, 70°. A cam surface 39 is provided having two symmetrical sloping active faces 41 and 42, each effective for 10° of angular rotation of the clutch, as will be described below. Lower clutch half 45 has upwardly extending jaws 46 and 47 which fit in between the jaws 37 and 38, but are of a smaller angular extent, for example, 60° as shown, thus allowing 10° of play between the jaws of the upper and lower halves of the clutch. Lower clutch half 46 is also provided with a radially extending plate 48 having two notches 49 and 51 which are angularly displaced from each other by 90°, in order to latch the lower jaw in either extreme position of the butterfly valve, as will be shown below. As shown in FIG. 5, the valve is in the locked open position, in which it is held by latch element 52, spring pressed into notch 49 by spring 53. The butterfly valve is thus held firmly in the valve open position when there is no fluid pressure in either one of pipe lines 7 or 8 of the actuator. When it is desired to close the butterfly valve, control valve 9 is manipulated by the operator to connect pipe line 7 to the high pressure line 13, thus causing the vane 23 to rotate in the clockwise position, it being at that time in the 100° displaced position from that shown in FIG. 3. Due to the 10° of play previously described between the upper and lower clutch jaws, the upper jaw will rotate for 10° before it engages the lower jaw. During this 10° of motion, the sloping face 41 of cam 39 engages the edge of latch 52 and pushes it out of notch 49 against the pressure of its spring 53. By the time the upper and lower jaws are in engagement, the latch is therefore out of the way, and the butterfly valve can be rotated from the open position into the closed position, which is 90° displaced from the open position. In this last position, notch 51 is now opposite latch 52, and on the upper jaw, sloping cam surface 42 is ahead of the notch 51 allowing the spring pressure of 53 to force latch 52 into notch 51, which now locks the butterfly valve in the closed position to hold it securely even though there is no hydraulic pressure on the line. This enables the tight seal to be maintained at the butterfly valve to effectively and securely close same, without requiring that the hydraulic actuator line pressure be maintained. At the same time, no additional piping or electric wiring or other control mechanism is required between the operator's position and control valve 9 and the remotely located butterfly valve.

Due to the remote location of the supply valve which is being controlled, it is desirable to have at the location at which the operator is manipulating the valves 9, some means for indicating the operative condition of the valve. If the actuated valve should become stuck, or for some other reason fail to operate, the consequences could be both serious and expensive. It is very desirable that the remote valve position indicator should require no additional piping or wiring to the remote valve location, yet it should provide the minimum of interference with the normal operation of the system. A system for accomplishing this is shown schematically in FIG. 10. It is inserted into either one of the pressure lines 7 or 8, being shown in this case inserted in line 8. Line 8 is connected to lines 55, 56 and 57. Line 57 is connected to a small rotary oscillating torque actuator 58. Such an actuator, approximately two inches in diameter, and having a full 270° of oscillation, is available commercially under the trademark "Rotac." A cylinder and piston may be substituted for the rotary actuator with the same results. The actuator is connected back to the left-hand side of the line, at 8', through an adjustable orifice 59, which will be shown in more detail below. Two oppositely directed check valves 61 and 62 are respectively provided in lines 56 and 55 to restrict the fluid flow in each line in the respective directions indicated by the arrows. Thus when the fluid flow in line 8 is to the left, line 55 is closed and line 56 is open through check valve 61, and when the fluid flow is to the right, it can flow only in line 55. The check valves are set to provide a few pounds of differential pressure, for example, 20 pounds, in their respective directions. It will thus be apparent that as fluid flows to the right, for example, in line 8, most of the fluid will pass through line 55 with relatively little obstruction, but a certain amount of it, controlled by adjustable orifice 59 and the differential pressure across check valve 62, will pass through line 57 to the actuator 58, causing it to rotate from the position shown (open position) through 270° to the closed position. The operator now knows that the valve is closed and since it latches in the closed position, as previously indicated, he can now return the control valve to the neutral position, thus shutting off the pressure fluid to the actuator. If the actuator valve should be stuck in any intermediate position, then there would be no appreciable flow of fluid in line 8, since this would be blocked by the immovable vane 23 of the actuator, and therefore the vane 63 of the indicator 58 would also not move, or else at most would move very slowly due to seal leakage as the flushing valve 26 is held closed by hydraulic pressure, which would cause only an imperceptibly slow motion of the indicator. The operator is thus correctly informed at all times of the operating condition of the remote valve. A major advantage of the present system is that it permits practically full flow of pressure fluid in lines 7 and 8, thus not interferring with the efficiency of operation of the main actuator. The system is preferably set so that vane 63 and its associated visible indicator needle 64 move somewhat more slowly than the main actuator, so that the main actuator vane 23 is in the fully closed position or fully open position respectively some time before needle 64 indicates these two positions. This has the advantage of permitting the previously-described flushing action to continue for a little while after the valve 26 is open, to cause flushing out of the main actuator 4.

FIGS. 11 and 12 show a preferred embodiment of the remote valve position indicator, in which a straight-line piston arrangement is used instead of the rotary miniature actuator 58 previously described. Corresponding elements are marked similarly to FIG. 10, with a prime (') added. Any commercially available type of check valve may be used at 61' and 62', the form illustrated being only exemplary. The restriction 59' is made adjustable by means of a screw 60, which enables control of oil through the piston cylinder, to obtain the desired indicating action. The piston 63' moves from one extreme position to the other in response to the flow of oil in the respective directions, and has built into it a magnet 66, which carries along with it a floating magnetic ball 64', serving as the indicator instead of the needle 64. Floating indicator 64' floats in a bath of kerosene, or similar liquid, 67, which has a transparent cover plate 68, suitably marked "open" and "close" to indicate the operative condition of the valve. The entire assembly can be cast as a single unit, preferably of non-corrosive, non-magnetic metal such as manganese bronze, suitably bored to provide the necessary apertures. O-ring seals are provided in the cylinder closure at 69, and in the piston at 71, in order to assure the necessary fluid-tightness. The advantage of the magnetic indicator is that it requires no movable mechanical element to pass through the casing, and therefore eliminates a possibility of leakage at this point. Another advantage of the construction of FIG. 12 lies in its compactness, which permits the device to be made very small in size. Since a number of these, possibly up to twenty in some installations, must be racked up on the control board, small size is essential, as the flow control valve must be directly associated with its indicator to be most useful. However, in some instances it is desired to put the control valve and indicator along side of the associated cargo trunk, but even in this case, it is desirable to have the indicator as small as is reasonably possible. Despite the small size of the indicator, the fact that the full flow of fluid through the indicator is not required for it to operate, permits it to handle a large volume of fluid in pipe lines 8 or 8' without appreciably interfering with the flow of fluid to operate the main valve actuator 4.

The system shown in FIG. 1, in a typical case, may involve as much as four hundred feet of piping in lines 7 and 8. If the valve 9 is in the central position, in which the lines 7 and 8 are typically sealed off from the pressure lines 11 and 12, then the possibility of expansion of the hydraulic fluid in lines 7 and 8 presents a danger that rupturing of the line may occur due to the high pressures caused by such expansion. It must be kept in mind that in normal service the temperature of the fluid in the lines may vary from below freezing temperatures in one location to temperatures up to 140° in another location of the tanker. In loading cargo, temperatures can change from 32° F. to 140° F. in a few minutes. Such expansion could easily cause rupturing of the pipe lines if not provided for. This can, of course, be taken care of by a safety pressure valve which would open upon a dangerous over-pressure, but this is both expensive and not always reliable. The danger due to expansion can be averted by special construction and arrangement of the manual valve as shown in FIGS. 13 and 14. Control handle 75 is fixed to rotary member 76, which is provided with two arcuate ports 77 and 78. Pipe lines 7, 8', 11 and 12 of FIG. 1 are connected to stationary block 78, which has a smooth, polished face 79 slidably engaging a corresponding face of rotor 76 to provide the desired interconnections of the piping in accordance with the position of handle 75. In the position shown, pressure line 11 is cut off from the other lines, so that no pressure fluid is supplied to the actuator 4. It will be apparent that if the handle 75 is moved 45° in either direction, pressure line 11 will be respectively connected to either line 7 or line 8. At the same time, that one of lines 7 and 8' which is not connected to the pressure line 11 will be still connected to return line 12 and thence through line 14 to the sump 18. Thus by manipulating handle 75, the pressure can be supplied in eithed direction to pipelines 7 and 8. If desired, handle 75 can be spring biased to the central position shown, so that when it is released by the operator, it returns to the cut-off position.

It should be noted that in the cut-off position shown in FIGS. 13 and 14, both lines 7 and 8' are connected to return line 12, and therefore any excess pressure which may develop in lines 7 and 8 due to expansion will be relieved through return pipe 12. Conversely, any drop in pressure due to contraction will merely cause the system to draw a little more fluid from the sump, to keep the pipelines full and operative at all times.

In a practical installation, the control center at which the valves 9, 9', etc., are located is always at a higher point than the actuator 4, which is typically below deck, so that there is a certain amount of gravity head on the pipe system 7, 8. This has the advantage that if any small leak develops in the system, the pressure fluid, which is a special fluid for this type of service, will flow out of the pipelines into the oil reservoirs of the ship, and not in the other direction, thus preventing contamination of the special pressure fluid.

In some situations, additional safety or emergency equipment may be desirable and this can be provided as shown at 20 in FIGS. 1 and 15. In this case, the actuator 4 is provided with a shaft extensions 22', which is coupled at 81 to extension rod 82, which in a typical case may be as much as 50 feet in length in order to extend through the deck 83 of the tanker. A bearing and stuffing box 84 is provided for passage of rod 82 through the deck 83. The upper end of the rod is squared off as shown at 86 so that a portable wrench or key can be used for emergency operation of butterfly valve 3, or any other type of key arrangement can be used to enable emergency manual operation by direct mechanical connection, in the event of breakdown of the hydraulic system. A vane 87 is provided to indicate on deck the position of the valve 3. Due to the 100° actuation of shaft 22 required for 90° motion of valve 3, the "open" and "shut" positions of the vane 87 should be clearly marked on the deck or by some other reference means. This direct mechanical linkage thus provides emergency control of the valves under all conditions.

It will be apparent that the above-described system provides, by simple and inexpensive means, for the remote control of main supply valves with positive locking of the main valves, simple but reliable indication of the operative condition of the valves, and protection against damage due to expansion.

It will be apparent that the embodiments shown are only exemplary and that various modifications can be made in construction and arrangement within the scope of my invention as defined in the appended claims.

I claim:

1. A marine tanker fluid cargo control system comprising a main fluid cargo line; a main valve for controlling the supply of fluid in said line; a hydraulic motor; mechanical clutch means connecting said main valve and said hydraulic motor and having two extreme positions corresponding to the full open position and to the full closed position of the main valve, constituting the extreme position of said valve; said clutch means including a driving element positively connected to said motor and a driven element positively connected to said valve, jaws associated, respectively, with said driving and driven elements and movable into or out of engagement with each other upon operation of said motor toward and from its extreme positions; mechanical latch means for firmly latching said main valve in one of its extreme positions, and mechanical latch operating means actuated by initial motion of said driving element from one of its extreme positions toward the other extreme position to release said latch means prior to engagement of said jaw means on continued motion of said clutch means toward said other extreme position to actuate said main valve; a pressure fluid line, and a manual control valve operable to connect said pressure line to said hydraulic motor.

2. The invention according to claim 1, said main valve and hydraulic motor being located far below the deck of a marine tanker, and emergency equipment comprising an extension shaft coupled directly to the hydraulic motor for rotation therewith between two angular positions corresponding to the full open and full closed positions of the main valve, said shaft extending directly through the deck, indicating means directly coupled to the shaft above deck for indicating the operative position of the valve, and force coupling means on said shaft above deck for applying manual force to rotate said shaft and thus manually operate the valve.

3. The invention according to claim 1, said hydraulic motor comprising a casing, stop means in said casing, a vane movable to an extreme position in either of two directions in said casing under hydraulic pressure, in substantially fluid-tight relationship with said casing, means for admitting pressure fluid from said pressure fluid line alternatively to one side of said vane to urge it in either direction and simultaneously exhausting fluid from the other side; a shaft coupling said clutch and said vane for actuation of the clutch by the hydraulic motor; an aperture in said vane permitting restricted passage of power fluid from one side of said vane to the other when said aperture is open; a shaft loosely fitting in said aperture and filling only a portion of said aperture to permit restrictive flow of fluid in said aperture, valve means on one end of said shaft and movable under fluid pressure to cover the aperture; and stop means in said casing engaging the other end of said shaft at an extreme position of the vane to open said valve means to permit restricted flow of fluid through said vane aperture in said extreme position of the vane.

4. A marine tanker fluid cargo control system comprising a main fluid cargo line; a main valve for controlling the supply of fluid in said line; a hydraulic motor; mechanical clutch means connecting said main valve and said hydraulic motor and having two extreme positions corresponding respectively to the full open position and to the full closed positions of the main valve, constituting the extreme positions of said valve; a fluid power supply line system having a high-pressure line containing fluid at high pressure, a low-presure return line, and a sump for receiving fluid from said low-pressure line, and high-pressure pump means supplied from said sump and connected to said high-pressure line; a pair of local pressure fluid lines connected to said hydraulic motor for providing power fluid to and returning it from said motor in either direction to provide reversible operation of said motor; a manually operable valve for directing pressure fluid from said pressure line in either direction through said pair of local pressure fluid lines to operate said main valve in either direction, said manually operable valve having a shut-off position for cutting off said high pressure line from said pair of local lines, and having fluid passage means connecting both of said local lines in the shut-off position of the manually operable valve, to said low-pressure return line, said clutch means including a driving element positively connected to said motor and a driven element connected to said valve, jaws associated, respectively, with said driving and driven elements and movable into or out of engagement with each other upon operation of said motor toward and from its extreme positions; and latch means for firmly latching said main valve in one of its extreme positions, and mechanical latch operating means actuated by initial motion of said driven element from one of its extreme positions toward the other extreme position to release said latch means prior to engagement of said jaw means on continued motion of said clutch means toward said other extreme position to actuate said main valve.

5. A marine tanker fluid cargo control system comprising a main fluid cargo line; a main valve for controlling the supply of fluid in said line; a hydraulic motor; mechanical clutch means connecting said main valve and said hydraulic motor and having two extreme positions corresponding respectively to the full open position and to the full closed position of the main valve, constituting the extreme positions of said valve; a fluid power supply line system having a high-pressure line containing fluid at high pressure, a low-pressure return line, and a pump for receiving fluid from said low-pressure line, and high-pressure pump means supplied from said sump and connected to said high-pressure line; a pair of local pressure fluid lines connected to said hydraulic motor for providing power fluid to and returning it from said motor in either direction to provide reversible operation of said motor; a manually operable valve for directing pressure fluid from said pressure line in either direction through said pair of local pressure fluid lines to operate said main valve in either direction, said manually operable valve having a shut-off position for cutting off said high-pressure line from said pair of local lines, and having fluid passage means connecting both of said local lines in the shut-off position of the manually operable valve, to said low pressure return line; said clutch means including a driving element positively connected to said motor and a driven element positively connected to said valve, jaws associated, respectively, with said driving and driven elements and movable into or out of engagement with each other upon operation of said motor toward and from its extreme positions; and main valve position indicator means located adjacent said control valve for indicating the position of said main valve, said indicator means comprising two parallel fluid bypass lines connected as a pair in series with one of said pair of local lines, each of said bypass lines having a check valve oppositely oriented from that in the other bypass line and each set to open in its direction at a much lower pressure than the high-pressure of the main high-pressure line, a bi-directional pressure indicator connected in parallel, through a restricted aperture, with said two bypass lines, whereby a relatively large volume of pressure fluid flows with little hindrance in one of said bypass lines during operation of the hydraulic actuator, while a small amount of the pressure fluid is diverted to said indicator to operate it.

6. The invention according to claim 5, said bypass directional indicator comprising a chamber, a piston movable in either direction in said chamber in response to fluid pressure applied to one side or the other of said vane, a magnet carried by said vane, and a movable magnetic follower closely guided in a path external of said casing and parallel to the path of movement of the vane, for indicating externally of the casing the position of the vane.

7. The invention according to claim 6, said restrictive aperture being adjustable as to size by manually operable means external of the casing.

8. A hydraulic motor movable to and from a fixed position; a controlled element movable toward and away from on operating position; mechanical clutch means between said motor and said element for transmitting motion of said motor, to and from said fixed position, to said element and thereby moving said element into and away from said operating position; said clutch means including a driving element positively connected to said motor and a driven element positively connected to said valve, jaws associated, respectively, with said driving and driven elements and movable into or out of engagement with each other upon operation of said motor toward and from its extreme positions; mechanical latch means for firmly latching said element in said operating position; and mechanical latch operating means actuated by initial motion of said driving element as the motor moves from said fixed position, to release said latch means prior to engagement of said jaw means on continued motion of said clutch means as the motor continues to move away from said fixed position, to move the controlled element away from said operating position.

9. The invention according to claim 8, said latch operating means comprising a cam element having a surface engaging said latch means upon initial motion of said driving element, to release said latch means.

10. The invention according to claim 8, including latch operating means on said driving element actuated by final motion of the clutch means as the motor moves toward said fixed position to operate said latch means to firmly latch said element in said operating position.

11. The invention according to claim 10, said last latch operating means comprising a cam element having a surface engaging said latch means upon final motion of said clutch means, to operate said latch means.

12. A hydraulic drive system comprising a fluid supply and exhaust system, a hydraulic motor including a casing, stop means in said casing, a vane in said casing movable to an extreme position in either of two directions in said casing under hydraulic pressure, in substantially fluid-tight relationship with said casing; means for admitting pressure fluid from said fluid system alternatively to one side of said vane to urge it in one direction and simultaneously exhausting fluid from the other side; an aperture in said vane permitting restricted passage of power fluid from one side of said vane to the other when the aperture is open; valve means including a stem of greater length than said aperture extending through said aperture and having a head on each end thereof, said heads being movable under fluid pressure on an adjacent side of said valve to cover the adjacent side of said aperture while uncovering the other side thereof; said stop means in said casing being engaged by said valve means at an extreme position of the vane to open said valve means against seating pressure to permit restricted flow of fluid from said one side through said vane aperture in said extreme position of the vane.

13. The invention according to claim 12, and a controlled element driven by said motor between two extreme positions, and indicator means for indicating the position of said controlled element, said indicator means comprising two parallel fluid bypass lines connected as a pair in series with one side of the fluid supply, each of said bypass lines having a check valve oppositely oriented from that in the other bypass line and each set to open in its direction at a much lower pressure than the pressure in the fluid supply system, a bi-directional pressure indicator connected in parallel, through a restricted aperture, with said two bypass lines, whereby a relatively large volume of pressure fluid flows with little hindrance in one of said bypass lines during operation of the hydraulic motor, while a small amount of the pressure fluid is diverted to said indicator to operate it, said small amount of pressure fluid being sufficient to move the indicator means more slowly than the vane of the hydraulic motor, to insure that said restricted flow of fluid through the vane continues for a while after the vane is in its extreme position, to flush the hydraulic motor.

14. In a hydraulic system having an operator for moving a controlled element between two positions, indicator means located adjacent said operator for indicating the position of said controlled element, said indicator means comprising two parallel fluid bypass lines connected as a pair in series with the hydraulic system, each of said bypass lines having a check valve oppositely oriented from that in the other bypass line and each set to open in its direction at a much lower pressure than the high pressure of the main hydraulic system, a bi-directional pressure indicator connected in parallel, through a restricted aperture, with said two bypass lines, whereby a relatively large volume of pressure fluid flows with little hindrance in one of said bypass lines during operation of the hydraulic actuator, while a small amount of the pressure fluid is diverted to said indicator to operate it.

15. The invention according to claim 14, said bypass directional indicator comprising a chamber, a piston movable in either direction in said chamber in response to fluid pressure applied to one side or the other of said vane, a magnet carried by said vane, and a movable magnetic follower closely guided in a path external of said casing and parallel to the path of movement of the vane, for indicating externally of the casing the position of the vane.

References Cited by the Examiner

UNITED STATES PATENTS

| | | | |
|---|---|---|---|
| 1,777,324 | 11/30 | Mock | 251—297 |
| 2,042,186 | 5/36 | Peterson | 137—625.21 |
| 2,078,231 | 4/37 | Brisbane | 251—58 X |
| 2,233,521 | 3/41 | Ernst et al. | 91—401 |
| 2,463,931 | 3/49 | Wyckoff | 121—38 |
| 2,543,876 | 3/51 | Smith | 121—38 |
| 2,888,029 | 5/59 | Govan et al. | 251—59 X |

ISADOR WEIL, *Primary Examiner.*

WILLIAM F. O'DEA, *Examiner.*